United States Patent [19]

Elsten

[11] Patent Number: 5,064,403
[45] Date of Patent: Nov. 12, 1991

[54] APPARATUS FOR SEPARATING MEAT FROM POULTRY BONES

[75] Inventor: Stanley E. Elsten, Riverton, Kans.

[73] Assignee: Sterling Manufacturing Company, Inc., Miami, Okla.

[21] Appl. No.: 548,230

[22] Filed: Jul. 5, 1990

[51] Int. Cl.$^5$ .............................................. A22B 3/08
[52] U.S. Cl. ...................................... 452/135; 452/138
[58] Field of Search ............... 17/16, 11, 46; 452/135, 452/138, 136, 137, 139, 140, 180, 198

[56] References Cited

U.S. PATENT DOCUMENTS

| | | | |
|---|---|---|---|
| 4,377,884 | 3/1983 | Viscolosi | 17/11 |
| 4,380,849 | 4/1983 | Adkison et al. | 17/11 |
| 4,446,600 | 5/1984 | Hooley et al. | 17/11 |
| 4,488,332 | 12/1984 | Attick et al. | 17/46 |
| 4,495,675 | 1/1985 | Hill et al. | 17/16 |
| 4,538,324 | 9/1985 | Prosenbauer | 17/16 |
| 4,575,899 | 3/1986 | Prosenbauer | 17/16 |
| 4,736,492 | 4/1988 | Hazenbroek et al. | 17/46 |
| 4,811,456 | 3/1989 | Heuvel | 17/16 |
| 4,882,810 | 11/1989 | Ostholt et al. | 17/11 |
| 4,932,102 | 6/1990 | Hazenbroek et al. | 17/46 |

Primary Examiner—Frederick R. Schmidt
Assistant Examiner—Lawrence Cruz
Attorney, Agent, or Firm—Litman, McMahon & Brown

[57] ABSTRACT

Apparatus for removing meat from the drumsticks of poultry, such as turkeys and chickens, utilizes aligned, tandem cylinders, the first of which urges the second along a guided path, the second carrying a centering cone pusher thereon for receiving the meat end of the drumstick axially thereinto. Transversely moving gates engage the drumstick about the hock knuckle end and the centering cone, upon moving forward under the force exerted by the first cylinder against the second cylinder, pushes the hock knuckle end through and past the closed gates. This places extreme tension on the tendons between the gates and where they are attached to the hock knuckle, causing the tendons to break while the meat is formed into a gatered mass in and adjacent the centering cone. The gates are withdrawn and the second cylinder is activated, causing a rod to project axially through the meat mass and against the meat end of the bone, urging the bone through a guide passageway and normally expelling it from the apparatus. The withdrawal of the projecting rod and centering cone leaves an open area where the deboned meat mass may be easily removed for repeating the cycle.

10 Claims, 4 Drawing Sheets

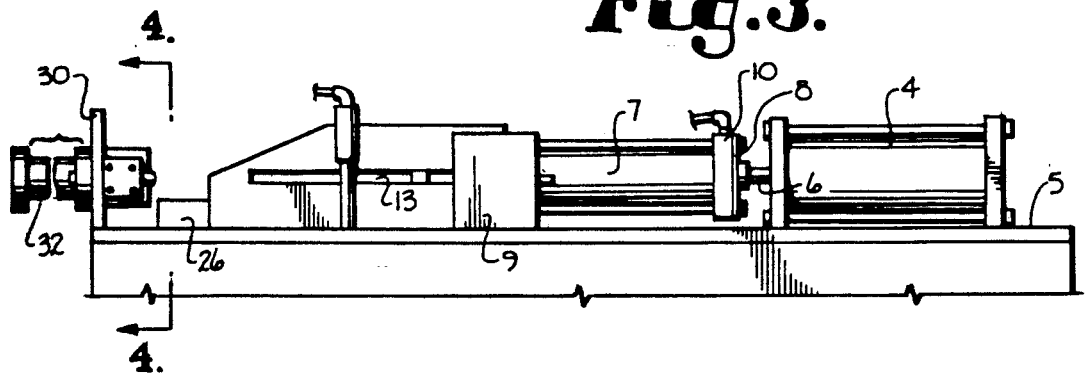
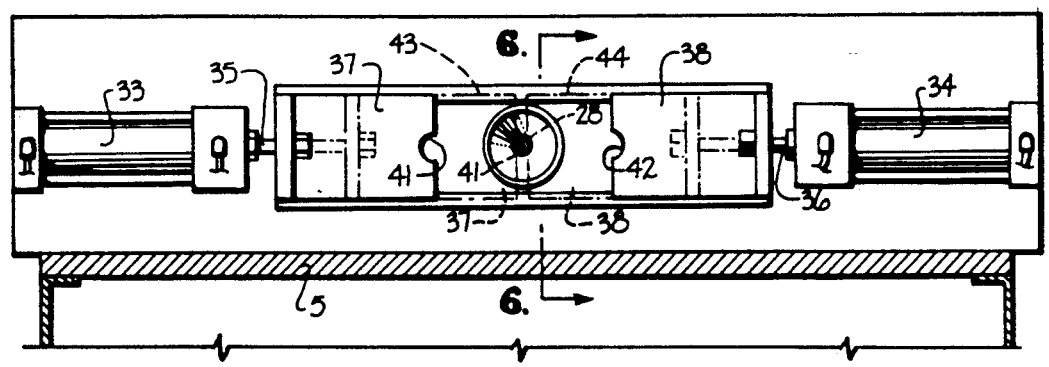
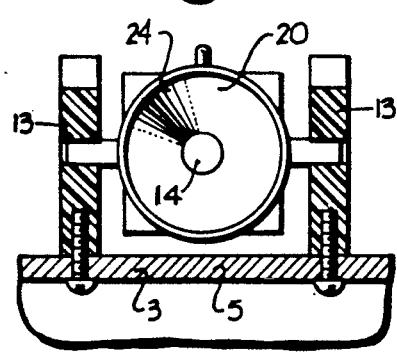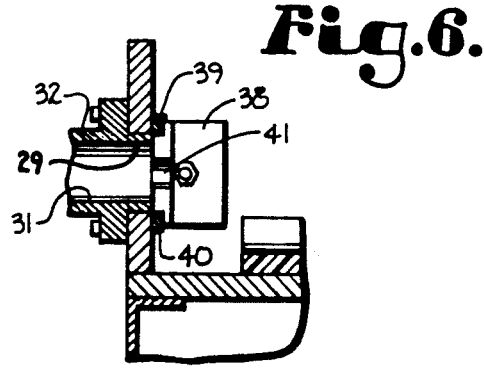
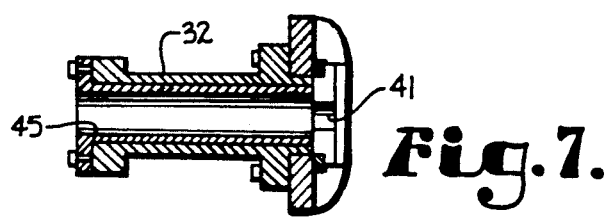

APPARATUS FOR SEPARATING MEAT FROM POULTRY BONES

BACKGROUND OF THE INVENTION

The present invention involves apparatus which functions to rapidly and efficiently separate the leg bone (tibia) from the meat portion of poultry or fowl drumsticks, without the use of cutting elements The apparatus relies instead upon clamping elements and sliding movement to apply tensile forces to the tendons connecting the meat to the hock end of the bone, rupturing the tendons between the clamping elements and the hock. As the tendons are ruptured, the meat, with a portion of the ruptured tendons is gathered into a mass, from which the bone is ejected, and then the mass is exposed for easy removal.

Prior art devices are known which strip meat from poultry drumsticks, however, all appear to be comparatively inefficient, relatively complex, slow in operation, unreliable or have a tendency to leave excessive bone chips in the meat. Many such prior art devices are also difficult to clean and maintain to acceptable human food processing standards.

SUMMARY OF THE INVENTION

This invention is embodied in apparatus having provision for supporting and driving, with a centering cone, a poultry drumstick bone slidably through closed, clamping gates while preventing the meat from following, thereby stretching the tendons, connecting the meat to the gristle pad at the hock end, to the point where they rupture between the gates and the hock. Sharp instruments are not used. After the tendons rupture, the gates are withdrawn and the bone is ejected through the gathered meat mass by an extending rod operating under independent, controlled pressure. Both the extending rod and centering cone are withdrawn, leaving the deboned meat mass easily accessible for removal and beginning the next cycle.

In this example, the apparatus includes a pair of axially ganged pneumatic cylinders, the first urging the second along a guided path. The second cylinder supports the forwardly directed centering cone for movement toward the meat end of the previously placed drumstick. Through appropriate, preferably automatic sequencing, transverse retaining gates are closed in slidably clamped relation about the hock (small end) of the bone and remain in this state until tendons are strained in tension past the rupture point. The gates are then withdrawn and the second cylinder actuated to axially urge the extending rod through the centering cone and the meat mass where the rod end contacts the bone end and drives it out through a sized passageway, while the meat mass is retained in position with minimal damage. The exit passageway is sized to offer ample room for the bone ejection while providing sufficient resistance against meat being ejected with the bone.

OBJECTS OF THE INVENTION

The objects of the present invention are: to provide apparatus for separating the bone from the meat of fowl drumsticks without the use of sharp cutting edges; to provide such apparatus which breaks tendons connecting the meat to the hock through the use of momentary clamping with sliding produced by cooperation between closed gates and controlled axial movement of a centering cone; to provide such an arrangement which utilizes axially tandem cylinders for providing easily controlled and accurate cooperation for meat collection and deboning; to provide such apparatus which functions efficiently over a short cycle time and yet leaves the deboned meat easily accessible for removal and beginning the next cycle; and to provide such a machine which is relatively simple in construction, easily cleaned and maintained for human food processing and highly efficient for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include an exemplary embodiment of the present invention and further illustrate various objects and features thereof.

BRIEF DESCRIPTION OF THE DRAWINGS

FIG. 3 is a side elevation of the operable portions of the apparatus, the supporting carriage being absent for illustrative purposes.

FIG. 4 is a fragmentary elevation taken on the lines 4—4, FIG. 3, particularly showing the gate clamping arrangement.

FIG. 5 is a fragmentary elevation on an enlarged scale taken on the line 5—5, FIG. 2, showing the centering cone and second cylinder guides.

FIG. 6 is a fragmentary, cross-sectional view, on an enlarged scale, taken on the line 6—6, FIG. 4, showing one of the gates, guides therefor, and bone ejection passageway.

FIG. 7 is a fragmentary elevational view on an enlarged scale showing the bone ejection passageway reduced in diameter by a removable guide tube.

DETAILED DESCRIPTION OF THE INVENTION

Figure 1:
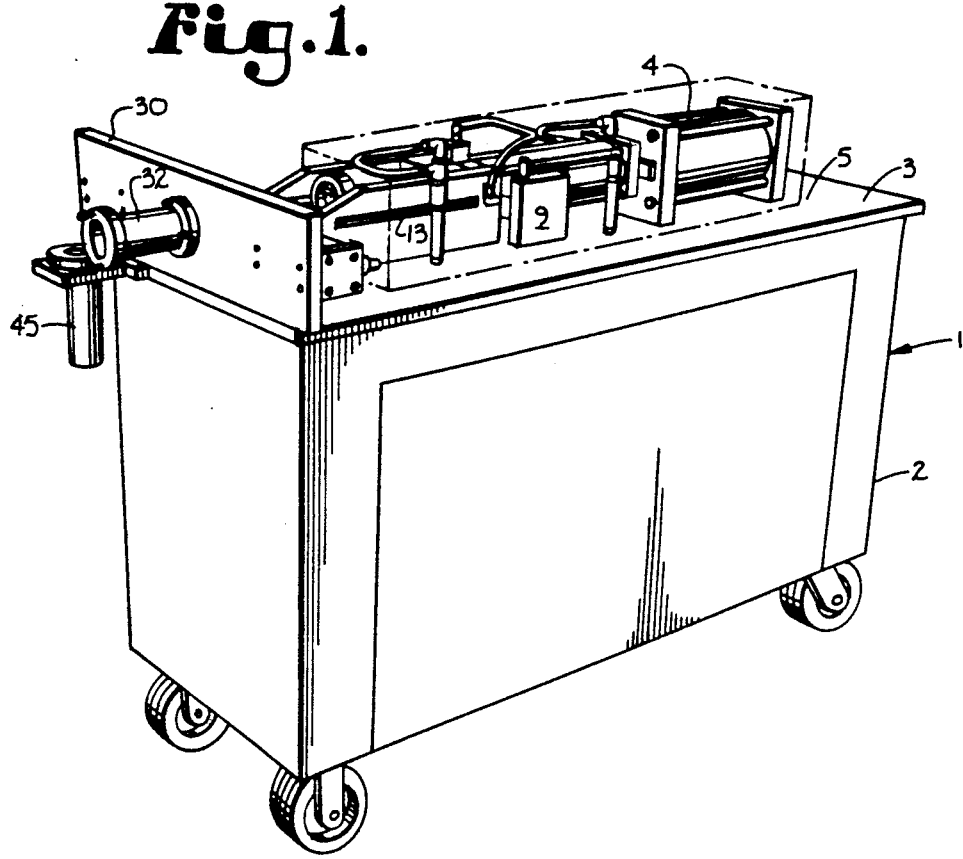
FIG. 1 is a perspective view of the apparatus showing major features thereof, including the supporting carriage.
Figure 2:
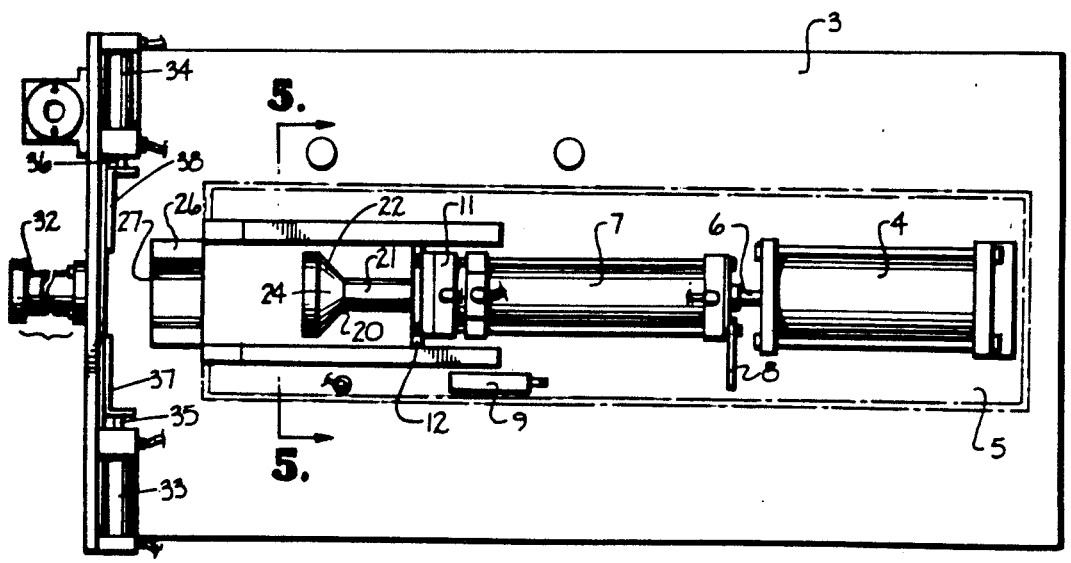
FIG. 2 is a top plan view of the apparatus.

As required, a detailed embodiment of the present invention is disclosed herein; however, it is to be understood that the disclosed embodiment is merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally indicates a fowl drumstick deboning apparatus embodying this invention. The apparatus 1, in this example, includes an appropriate wheeled support carriage 2 containing enclosed chambers (not shown) which function as a compressed air storage reservoir to reduce momentary system pressure drop during apparatus operation. Appropriate control members (not shown other than schematically) such as solenoid valves, switches, tubing, wiring and the like are conveniently located on the underside of an elongated top plate 3 and are connected to the functional devices on the upper side of the top plate 3.

Figure 10:
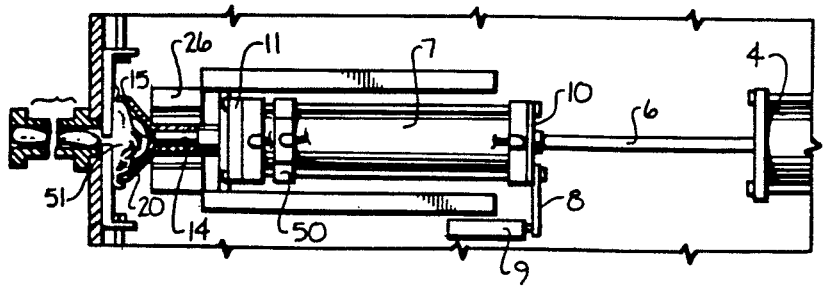
FIG. 10 is a fragmentary plan view similar to FIG. 9, but showing the centering con at the limit of its stroke and before actuation of the bone ejecting rod.
Figure 11:
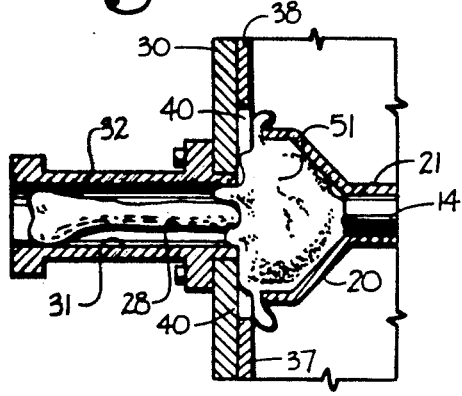
FIG. 11 is a fragmentary plan view similar to FIG. 10, but on an enlarged scale, showing the gates withdrawn prior to bone ejecting rod projection.

Functional devices of the apparatus 1 include a first prime mover or main air cylinder 4 mounted longitudinally on the top plate 3 near the rear 5 thereof. The first cylinder 4 includes a piston rod 6 connected to a secondary prime mover or second cylinder 7. The second cylinder 7, in this example, is axially aligned with the first cylinder 4 and includes an actuator finger 8 spaced from but aligned with a switch 9 located to sense the first cylinder 4 attaining the desired stroke length, FIG. 10.

The rear 10 of the second cylinder 7 is secured to and supported for axial movement by the first cylinder piston rod 6, whereby linear motion of the rod 6 is directly translated into a similar linear motion at the rear of the second cylinder 7. The front 11 of the second cylinder 7 is supported by horizontally extending wings 12 which ride in elongated grooves or guides 13 so as to create axial motion also of the front of the second cylinder 7 in response to reciprocal motion of the piston rod 6.

Figure 8:
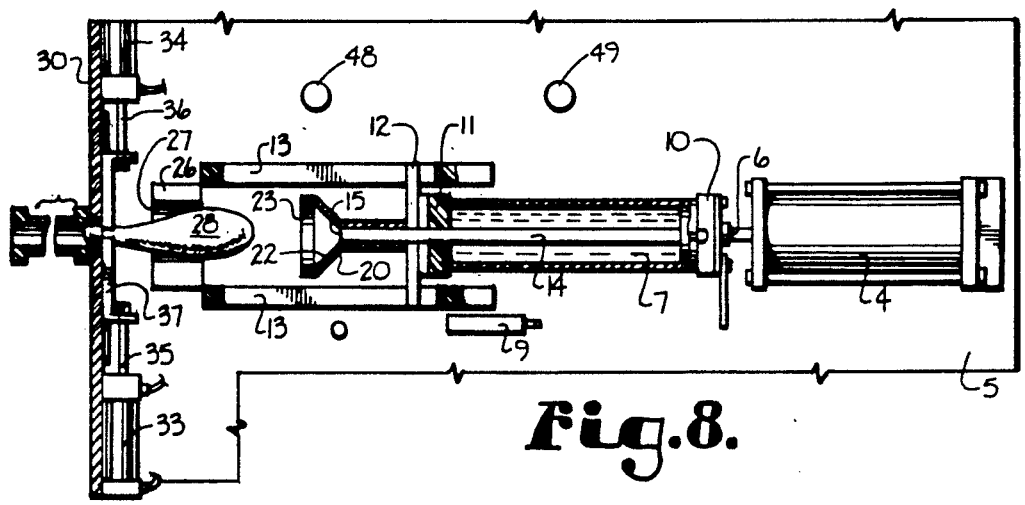
FIG. 8 is a fragmentary plan view of the apparatus showing a drumstick resting on a support in position for deboning.
Figure 9:
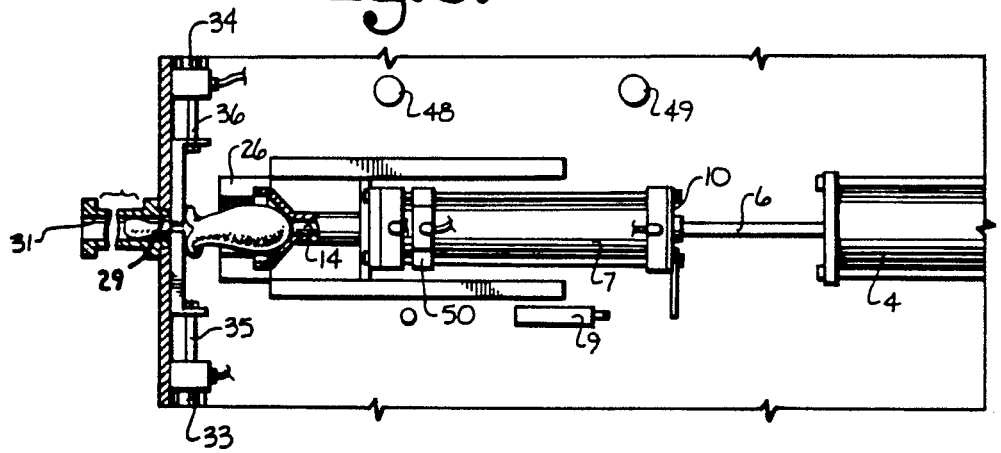
FIG. 9 is a view similar to FIG. 8 but showing the centering cone receiving the meat end of the drumstick thereinto and the hock end of the bone moved partially into the bone guide.

A piston rod 14 is contained within and projects forwardly from the second cylinder 7, terminating in a front end 15 having a flattened transverse configuration. A receiver in the shape of a centering cone 20 comprises a hollow cylindrical stem 21 slidably receiving a forwardly projecting portion of the piston rod 14. The rod front end 15 normally forms an axial plug for a conical, hollow receiver 22 which flairs outwardly therefrom, as shown in FIG. 8. The receiver 22 terminates forwardly in a cylindrical lip 23 which radially encloses the widest part of the cone portion 24.

Figure 12:
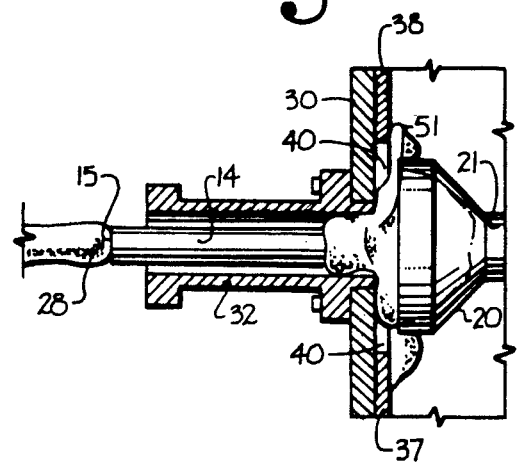
FIG. 12 is a view similar to FIG. 11 but showing the bone ejection rod projecting through the meat mass and ejecting the bone through the bone guide passageway.

Since the rear of the stem 21 is secured to the front 11 of the second cylinder 7, the centering cone 20 moves therewith. However, when the second cylinder 7 is actuated, the piston rod 14 moves axially through the centering cone 20 to extend substantially forwardly therefrom, FIG. 12.

A drumstick saddle or support 26 is located forwardly of the second cylinder front end 11 and has an open semicircular depression 27 transversely centered with respect to the axis of the centering cone 20. The depression 27 is sized to generally align the large or meaty end of the drumstick 28 with the centering cone 20 while the hock, or small end, rests within an orifice 29 in an end wall 30. The orifice 29 comprises the entrance to a guide passageway 31 formed by a cylindrical projecting member 32.

Spaced apart, opposed cylinders 33 and 34, in this example, are positioned transversely on opposite sides of the piston rod 14 axis and respectively have piston rods 35 and 36 projecting toward each other. The piston rods 35 and 36 are respectively secured to opposed gates 37 and 38 which are slidably mounted on guides 39 and 40. Thus, the respective gates 37 and 38 are adapted to move toward and away from each other upon simultaneous actuation of the cylinders 33 and 34.

As best shown in FIG. 4, the gates 37 and 38 have opposed, generally semi-cylindrical notches 41 and 42 adapted to partially or completely surround and clamp, for sliding motion, the drumstick hock therebetween during apparatus operation, as shown by the broken lines 43 and 44, FIG. 4.

The guide passageway 31 may be conveniently narrowed in diameter, when desired for smaller drumsticks, by utilizing an insert cylinder 45 slidably received into the cylindrical member 32, FIG. 7.

Figure 13:
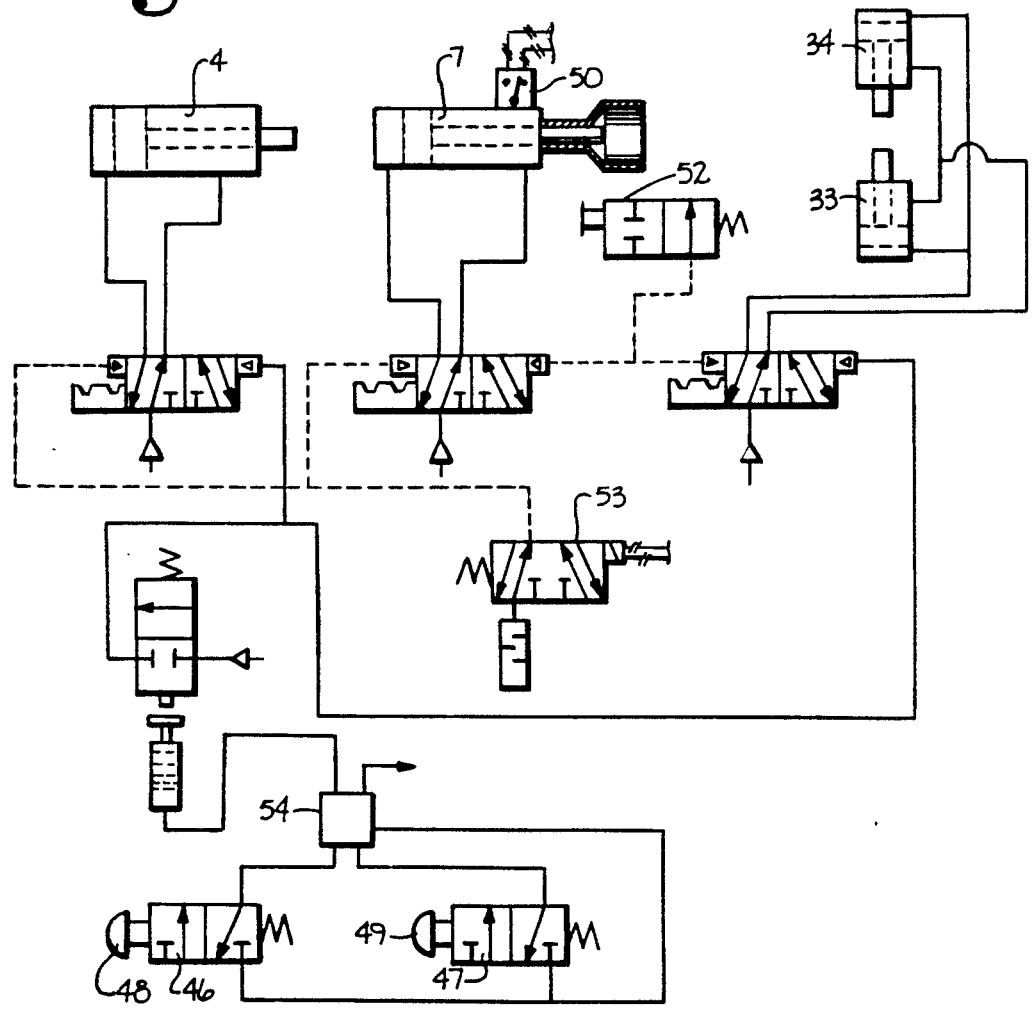
FIG. 13 is a schematic view illustrating a pneumatic control system for the apparatus.

FIG. 13 schematically illustrates the cooperating control relationship of the various operational parts, including the cylinders 4, 7, 33, and 34, cycle switches 46 and 47, initiating buttons 48 and 49, and magnetic locating sensor switch 50 associated with the second cylinder 7.

In operation, the drumstick 28 is placed with the large (meaty) end thereof on the drumstick support 26, resting in the depression 27 with the hock end partially projecting into the orifice 29. The cycle initiating switches 46 and 47 are then actuated by the simultaneous depression of control buttons 48 and 49 which causes the gates 37 and 38 to be moved inwardly under pressure produced by the gate cylinders 33 and 34, engaging the hock portion of the bone within the opposed semicircular notches 41 and 42. The first cylinder 4 is then actuated which causes the second cylinder 7 to move forwardly along the guides 13. The centering cone 20, moving with the cylinder 7, contacts and receives thereinto the large end of the drumstick 28, causing it to center and then pushing it, hock end first, slidably through the closed gates and into the guide passageway 31. This places tendons (not shown), particularly between the gates and the hock, under severe tensile load, causing them to rupture therebetween and tear loose primarily from the hock knuckle. As the cylinder 7 continues to be moved forwardly, the meat and remaining tendons (which are edible) are formed into a gathered mass 51 between the gates and the centering cone 20. At the end of the first cylinder 4 stroke, the gates 37 and 38 are withdrawn by reversing the cylinders 33 and 34. Approximately simultaneously, the front cylinder 7 is actuated and the rod 14 is caused to move forwardly, entering the meat mass 51, contacting the end of the bone, and ejecting the bone forwardly through and past the passageway 31.

The full stroke of the second cylinder 7 is sensed by the magnetic switch 50 which activates an air reversal, returning the cylinders 4 and 7 to home position and leaving the meat mass 51, now boneless, easily accessible for removal and insertion of the next drumstick.

In the sequencing operation described, the switch 9 actuates a solenoid valve 52 and the magnetic switch 50 actuates a valve 53. The numeral 54 indicates a control member which determines that both control buttons 48 and 49 are pushed generally simultaneously for the cycle to begin, ensuring that the hands of the operator are out of danger.

It has been determined that the above apparatus will debone average size turkey drumsticks with minimal bone chips and damage to the meat within a four second cycle.

While on form of this invention has been illustrated and described, it is not to be limited thereto except insofar as such limitations are included in the following claims.

What is claimed and desired to be secured by Letters Patent is as follows:

1. Apparatus for deboning drumstick meat comprising:
   (a) a first prime mover;
   (b) a second prime mover engageable with said first prime mover and adapted to move due to actuation of said first prime mover;
   (c) said second prime mover having a rod projectable therefrom;
   (d) a gathering member associated with said second prime mover and movable therewith, said rod being movable through said gathering member upon actuation of said second prime mover; and
   (e) means for supporting an animal drumstick in the path of said gathering member;
   (f) whereby said gathering member receives drumstick meat therein upon actuation of said first prime mover and the bone of the drumstick is ejected from the meat by movement of said rod through said meat upon actuation of said second prime mover.

2. The apparatus as set forth in claim 1 wherein:
   (a) at least one of said prime movers is a fluid powered cylinder.

3. The apparatus as set forth in claim 1 including:
   (a) a pair of transverse clamping gates respectively movable toward each other for engaging the drumstick during movement of said gathering member.

4. The apparatus as set forth in claim 3 including:
   (a) means forming a bone guiding passageway located downstream from said gates.

5. Apparatus for removing the bone from an animal drumstick comprising:
   (a) a first cylinder,
   (b) a second cylinder engaged with said first cylinder and adapted to move upon the actuation of said first cylinder;
   (b) said second cylinder having a piston rod adapted to move upon actuation of said second cylinder;
   (c) a centering cone secured to said second cylinder and movable therewith, said second cylinder piston rod being slidable through said centering cone;
   (d) said centering cone being adapted to engage the meaty end of a drumstick;
   (e) gate means for slidably clamping the hock end of the drumstick during movement of said centering cone;
   (f) whereby said centering cone urges the hock end of the drumstick through said clamped gate means thereby causing drumstick tendons to rupture, and the actuation of said second cylinder piston rod urges the drumstick bone axially beyond retained meat.

6. The apparatus as set forth in claim 5 wherein:
   (a) the centering cone includes a conical and a cylindrical portion for receiving the meat end of the drumstick.

7. The apparatus as set forth in claim 5 including:
   (a) guide means for guiding the second cylinder axially upon actuation by the first cylinder.

8. In fowl drumstick deboning apparatus:
   (a) tandem first and second cylinders respectively engaged with each other and arranged whereby said first cylinder moves said second cylinder,
   (b) said second cylinder including a piston rod and a meat receiver, said rod extending through said receiver upon actuation of s id second cylinder.

9. Apparatus for removing a bone from fowl drumstick meat comprising:
   (a) a first cylinder having a piston rod projecting therefrom;
   (b) second cylinder axially aligned with said first cylinder and engaged with said first cylinder piston rod,
   (c) said second cylinder being supported at the rear end thereof by said first cylinder piston rod and having a piston rod projecting forwardly therefrom, said second cylinder being reciprocally mounted for movement axially upon actuation of said first cylinder;
   (d) a centering cone mounted on said second cylinder and extending forwardly thereof;
   (e) said second cylinder piston rod being slidably movable axially through and forwardly of said centering cone upon actuation of said second cylinder;
   (f) a drumstick support mounted forwardly of the normal position of said centering cone;
   (g) a pair of transverse gates respectively slidable inwardly of the center line of said centering cone for engaging the hock end of a drumstick;
   (h) means forming a bone guiding passageway downstream from said gates,
   (i) said first cylinder urging said second cylinder forwardly whereby said centering cone engages the meaty end of a drumstick resting on said drumstick support and urges said hock end into said passageway whereupon the tendons in said drumstick are ruptured, said gates then being withdrawn and said second cylinder actuated for engaging said bone by said second cylinder rod and urging said bone through said passageway, leaving a boneless meat mass for withdrawal upon retracting said centering cone.

10. The apparatus as set forth in claim 9 wherein the operations are automatically sequenced.

* * * * *